(No Model.)

R. A. KULLMANN.
FINGER RING.

No. 313,084. Patented Mar. 3, 1885.

WITNESSES:
Johnes Deemer
C. Sedgwick

INVENTOR:
R. A. Kullmann
BY Munn & Co
ATTORNEYS.

United States Patent Office.

ROBERT A. KULLMANN, OF JERSEY CITY, NEW JERSEY.

FINGER-RING.

SPECIFICATION forming part of Letters Patent No. 313,084, dated March 3, 1885.

Application filed June 3, 1884. (No model.)

*To all whom it may concern:*

Be it known that I, ROBERT A. KULLMANN, of Jersey City, in the county of Hudson and State of New Jersey, have invented a new and Improved Finger-Ring, of which the following is a full, clear, and exact description.

The object of this invention is to provide practical means for holding initial letters or separate ornament upon rings, whereby any initial or ornament may be easily attached to the ring to suit the customer; and to this end the invention consists, principally, in forming the ring with a screw-threaded socket or stud, and in providing a face-screw adapted to pass through the initial or ornament and screw into the screw-threaded socket or stud from the front of the ring.

The invention also consists in forming the initial or ornament with an angular shank to fit in a correspondingly-shaped opening made in the gem or setting of the ring to prevent the initial or ornament from turning; also, in utilizing the head of the screw for ornamenting the ring.

Reference is to be had to the accompanying drawings, forming a part of this specification, in which similar letters of reference indicate corresponding parts in both the figures.

Figure 1:
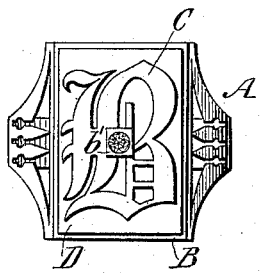
Figure 2:
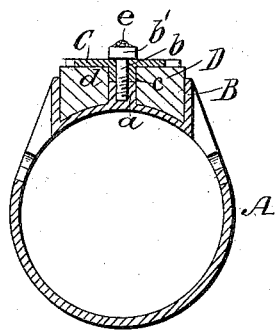

Figure 1 is a plan view of a finger-ring made in accordance with my invention, and Fig. 2 is a sectional elevation of the same.

The main body A and gem-box B of the ring may be of any desired size and form. In the gem-box B is formed the stud $a$, which has a screw-threaded opening formed in it to receive the screw-threaded end of the small screw or bolt $b$, which bolt passes through the center of the initial C from the front and holds the initial firmly upon the setting or gem D, fitted in the gem-box B. The initial C has the shank $c$ formed upon its lower surface, and the setting D has the passage $d$ made through it to fit upon the stud $a$, and to receive the shank $c$, and in this instance the stud $a$, shank $c$, and passage $d$ are all made square to fit nicely together and to prevent the initial C from turning out of place upon the face of the gem D, and the head $b'$ of the bolt $b$ is also, in this instance, made square, so that by applying a pair of pinchers or a small wrench to it the bolt may be easily removed and replaced for removing or attaching the initial C, and in this instance a small diamond, $e$, is set in the head $b'$ of the bolt $b$; but instead of this the head of the bolt may be made in any desired fanciful shape, so that the bolt serves in all cases both as an ornament to the ring and as means for holding the initial or separate ornament and adapting it to be removed and another initial or ornament attached or put in its place upon the ring. It will be noticed that the bolt $b$ does not reach through to the inside of ring, so that the ring is in no manner defaced by the bolt, but being utilized to ornament the ring, as stated, is almost altogether disguised, so that the ring has in every respect an ordinary appearance. It will also be noticed that by forming the stud $a$ and shank $c$ central to the gem-box and initial respectively any initial letter of the alphabet may be attached to the ring with the single bolt, so that any initial may be attached to suit the customer.

Although I have shown and described my invention applied to finger-rings, it will be understood that it may be applied to sleeve-buttons, ear-rings, lockets, bracelets, &c., and not depart from the spirit of my invention.

Having thus described my invention, what I claim as new, and desire to secure by Letters Patent, is—

1. The initial C, held to the ring by the bolt $b$, passing through the face of the initial from the front, substantially as described.

2. The ring A, having the screw-threaded stud $a$ formed upon it to receive the bolt $b$ from the front of the ring, substantially as shown and described.

3. The separate ornament or initial C, formed with the apertured shank $c$ upon its under surface, substantially as and for the purposes set forth.

4. The setting D, having the passage $d$ made through it, in combination with bolt $b$, the ring formed with the stud $a$, and the ornament or initial C, formed with the shank $c$, substantially as and for the purposes set forth.

5. The initial C, held upon the ring by the centrally-placed screw-bolt b, passing through it from the face of the initial, substantially as described.

6. The ring A, formed with the gem-box B and screw-threaded stud a, in combination with the setting D, formed with passage d, the initial C, formed with the shank c, and the headed screw-bolt b, arranged substantially as described.

ROBERT A. KULLMANN.

Witnesses:
H. A. WEST,
C. SEDGWICK.